United States Patent
Dias et al.

(10) Patent No.: US 9,695,285 B2
(45) Date of Patent: Jul. 4, 2017

(54) MACROMERS COMPRISING PENDANT POLYOXAZOLINE GROUPS AND END GROUPS

(71) Applicant: DSM IP ASSETS B.V., Heerlen (NL)

(72) Inventors: Aylvin Jorge Angelo Athanasius Dias, Echt (NL); Scott Curtin, Echt (NL); MengMeng Zong, Echt (NL); Meng Ouyang, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/890,302

(22) PCT Filed: May 23, 2014

(86) PCT No.: PCT/EP2014/060687
§ 371 (c)(1),
(2) Date: Nov. 10, 2015

(87) PCT Pub. No.: WO2014/191316
PCT Pub. Date: Dec. 4, 2014

(65) Prior Publication Data
US 2016/0108180 A1  Apr. 21, 2016

Related U.S. Application Data

(60) Provisional application No. 61/830,051, filed on May 31, 2013.

(30) Foreign Application Priority Data

May 31, 2013  (EP) .................................... 13170173

(51) Int. Cl.
| C08G 77/388 | (2006.01) |
| C08G 18/61 | (2006.01) |
| C08G 77/458 | (2006.01) |
| G02B 1/04 | (2006.01) |
| C08G 18/64 | (2006.01) |
| C08G 18/75 | (2006.01) |
| C08G 18/60 | (2006.01) |
| C08G 18/10 | (2006.01) |
| C08F 230/08 | (2006.01) |

(52) U.S. Cl.
CPC .......... *C08G 77/388* (2013.01); *C08F 230/08* (2013.01); *C08G 18/10* (2013.01); *C08G 18/603* (2013.01); *C08G 18/61* (2013.01); *C08G 18/6415* (2013.01); *C08G 18/6423* (2013.01); *C08G 18/755* (2013.01); *C08G 77/458* (2013.01); *G02B 1/04* (2013.01); *G02B 1/043* (2013.01)

(58) Field of Classification Search
CPC .............................. C08G 77/388; C08G 18/61
See application file for complete search history.

(56) References Cited

U.S. PATENT DOCUMENTS

| 6,039,913 | A * | 3/2000 | Hirt et al. ............... | A61L 27/16 264/331.11 |
| 6,759,496 | B2 | 7/2004 | Kunzler et al. | |
| 2010/0267897 | A1 | 10/2010 | Kennedy et al. | |
| 2012/0088844 | A1 | 4/2012 | Kuyu et al. | |
| 2012/0088861 | A1 | 4/2012 | Huang et al. | |

FOREIGN PATENT DOCUMENTS

| EP | 2 270 551 A2 | 1/2011 |
| WO | WO2012052527 A1 | 4/2012 |
| WO | WO2013120974 A1 | 8/2013 |

OTHER PUBLICATIONS

International Search Report issued in PCT/EP2014/060687, mailed on Sep. 11, 2014.

* cited by examiner

*Primary Examiner* — Kuo-Liang Peng
(74) *Attorney, Agent, or Firm* — Kevin M. Bull

(57) ABSTRACT

The invention is directed to a macromer comprising unit derived from a siloxane diol, di-isocyanates and a diol comprising a pendant group comprising an oligomer or polymer derived from methyl oxazoline or ethyl oxazoline. The invention also relates to a process for the preparation of said macromers, and to that the use of said macromers. The macromers according to the invention may be used in lenses, such as ophthalmic lenses. Films comprising the macromers according to the invention provide a surprisingly low modulus in combination with a high water content and oxidative stability.

20 Claims, 2 Drawing Sheets

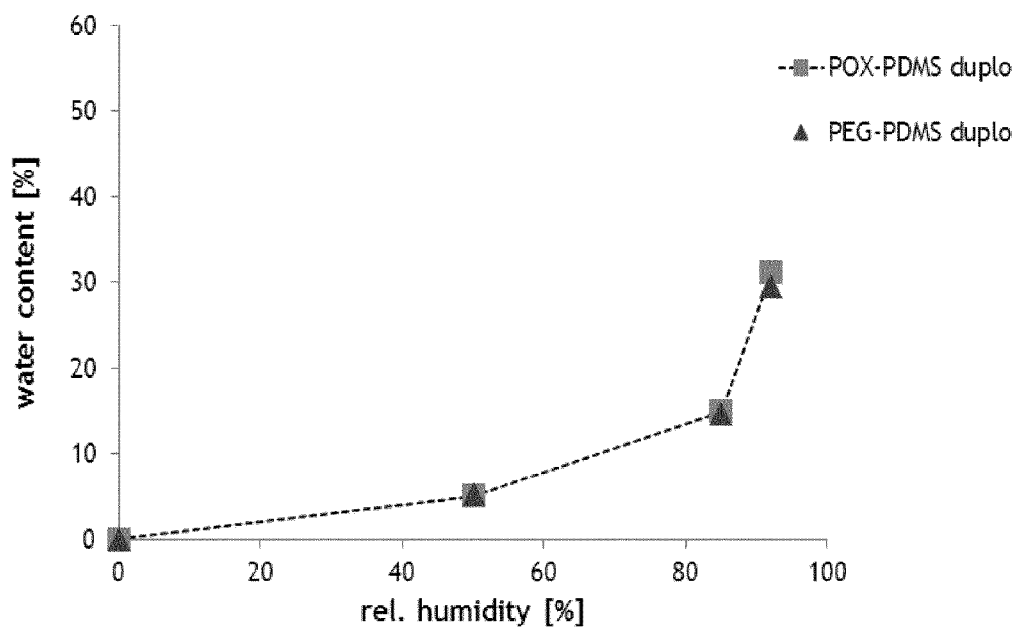
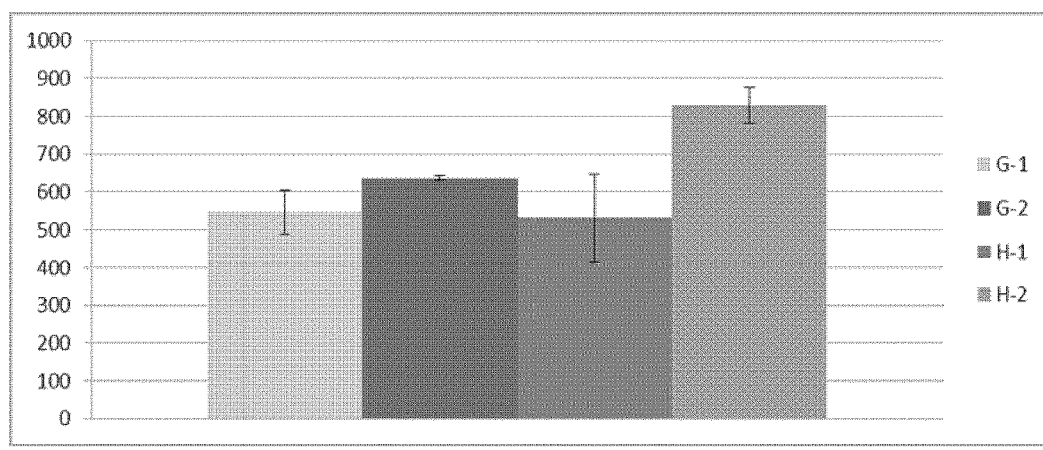

MACROMERS COMPRISING PENDANT POLYOXAZOLINE GROUPS AND END GROUPS

RELATED APPLICATIONS

This application claims priority to U.S. Provisional Patent Application 61/830,051 and European Patent Application EP13170173.2, which are both hereby incorporated by reference in their entirety.

FIELD

The invention relates to macromers comprising siloxane groups, a pendant group comprising an oligomer or polymer derived from methyl oxazoline or ethyl oxazoline, and end groups, and to a process for the production of such macromers, as well as to the use of said macromers. The macromers according to the invention may for example be used in lenses, such as ophthalmic lenses and contact lenses.

BACKGROUND

To design and select materials for silicone hydrogel lenses, many factors must be considered to optimize the physical, chemical and biological properties. Examples of these properties include oxygen permeability, wettability, lubricity, biocompatibility, physical strength, modulus, and optical requirements, to name just a few.

While patient comfort has driven the market use of silicone hydrogel lenses, the utility of these lenses depends on both the physical properties, such as oxygen permeability, water content, low Young's modulus, and lubricity of the lens, as well as the amount of protein and lipid deposition on the lenses during wear. A recent review by Tighe (A Decade of Silicone Hydrogel Development: Surface Properties, Mechanical Properties, and Ocular Compatibility, Eye and Contact Lens 39, 3-11 (2013)) noted that two important trends in contact lenses in the last decade were decreasing modulus and increasing water content. A low modulus contact lens is important because lower modulus lenses are more likely to conform to eye curvature, thereby resulting in improved user comfort. It was also noted that the trend in modulus reduction was not solely as a result of changes in water content.

Although silicone hydrogel lenses have been used extensively over the last 10 years, several difficulties with silicone hydrogel lenses are still encountered. These difficulties stem from the fact that silicone is a hydrophobic material.

For this reason, silicone lenses tend to develop a relatively hydrophobic, non-wettable surface in contact with a hydrophobic lens mold during manufacturing. Compatibilizing of hydrophilic and hydrophobic components within silicone hydrogel formulations is critical for the manufacturing of optically clear, wettable contact lenses. For instance, optical clarity may be negatively impacted by phase separation of hydrophobic silicone from hydrophilic components in the lens formulation or in the final lens saturated with aqueous media.

In addition, lipids and proteins have a high tendency to deposit on a hydrophobic surface. The deposits may negatively affect optical clarity and wear properties. Furthermore, adsorption of unwanted components from the ocular tear fluid on to the lens during wear is a contributory factor for reduced user comfort. In addition, bacterial infections can potentially occur if lens care regimens are not followed. The extent of undesirable adsorptions on the lens will determine the lens care needs for a specific lens and will impact the duration that the lens can be present in the eye.

Some of these difficulties can be alleviated by improving the hydrophilicity of the lens. Many approaches have been used to improve the hydrophilicity of the silicone based contact lenses. These include introducing wetting agents, using hydrophilic monomers, and synthesis of copolymers of silicone and hydrophilic polymers or oligomers.

In the synthesis of copolymers, one common approach has been to create block copolymers of silicones and a hydrophilic polymer. The hydrophilic polymer is typically polyethylene glycol (PEG) due to its availability with hydroxyl and amine terminated groups, which allows straightforward preparation of block copolymers.

SUMMARY

For the purpose of this text, POX refers to an oligomer or polymer derived from methyl oxazoline or ethyl oxazoline. A pendant POX group is a pendant group comprising a POX group.

The macromer according to the invention comprises siloxane groups, pendant groups comprising a POX group, and end groups.

Polyoxazolines have been promoted as alternatives to polyethyleneglycol (PEGs) and they have even been explored for use in contact lenses. In most cases they have been used as high molecular weight polymers that are mixed with silicone based macromers to form semi-interpenetrating networks as described in WO2004/081105 (J&J) and WO 2000/002937 (Cooper Vision). Macromers based on polyoxazoline have been described by US 2002/0075448 (B&L) while U.S. Pat. No. 6,039,913 (Novartis) describes the synthesis of PDMS-co-polyoxazoline methacrylate terminated macromers. However in both cases the polyoxazoline groups are in the backbone of the macromer. When polyoxazoline groups are in the backbone of the macromer, it may be difficult to achieve a lens that possesses sufficient clarity, water solubility, and oxygen permeability. The inventors have found some improvements with polysiloxane based block copolymers comprising pendant polyethylene glycol (PEG) groups; see WO2013/120974, assigned to DSM IP Assets BV. However, when used to prepare a film, the film prepared with the macromers comprising a pendant POX group shows surprising low modulus when compared to a film that is identical except for having been prepared from macromers comprising pendant polyethylene glycol (PEG) group, while the film maintains about the same water content. Moreover, it was discovered that a macromer comprising a pendant PEG group may suffer from lack of stability during autoclaving, which requires exposure to steam at high temperatures and pressures. Lack of autoclave stability may not normally be a problem since other sterilization methods are often available. However, in processes and industries that require autoclave sterilization, autoclave stability is a key property.

Polyoxazolines have been promoted as alternatives to polyethyleneglycol (PEGs) and they have even been explored for use in contact lenses. In most cases they have been used as high molecular weight polymers that are mixed with silicone based macromers to form semi-interpenetrating networks as described in WO2000/002937, assigned to Cooper Vision. However, the polyoxazoline may leach out over time and negatively affect the hydrophilicity of the lens.

The macromer according to the invention has a structure of formula (I) or (II) or (III) or (IV):

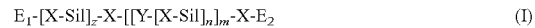  (I)

  (II)

  (III)

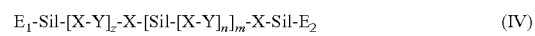  (IV)

wherein
E1 and E2 are end groups containing at least one reactive double bond,
Y is a diol derived unit comprising at least one pendant POX group,
X is a unit derived from a diisocyanate,
Sil is a unit derived from a siloxane diol,
and wherein m is an integer ranging from 1 to 50,
n is an integer ranging from 1 to 50, and
z is an integer ranging from 1 to 50.

The diisocyanate use in the preparation of a macromer according to the invention may be an aliphatic or aromatic diisocyanate. Preferably, the diisocyanate is an aliphatic diisocyanate.

The diol from which the Y unit is derived from comprises a backbone with an OH-group at either end, and pendant from the backbone is a side group comprising a POX group.

The macromers according to the invention also include an embodiment where the pendant POX groups have a number average molecular weight ranging from 300 to 5000 g/mol.

The Sil unit is derived from a siloxane having a terminal OH-group at either end, and may comprise polydimethylsiloxane (PDMS) or other poly di alkyl siloxanes.

An exemplary macromer may have the following structure:

$$E_1\text{-}[X\text{-}(Sil)_p]_n\text{-}X\text{-}[[Y\text{-}[X\text{-}(Sil)_p]_n]_m\text{-}X\text{-}E_2 \text{ or}$$

wherein at least one of E1 or E2 are hydroxyethylmethacrylate (HEMA),
Y is a unit derived from an α,α diol comprising a pendant poly(2-ethyl-2-oxazoline)
or a poly(2-methyl-2-oxazoline) pendant group,
X is a unit derived from isophorone diisocyanate (IPDI),
Sil is derived from a polydimethylsiloxane (PDMS) diol, and
wherein m is a number ranging from 1 to 50,
n is a number ranging from 1 to 50,
p is a number ranging from 1 to 75.

The number average molecular weight of the total macromer may range from 4,000 to 50,000 g/mol.

The present disclosure is also directed to a method for the production of a macromer comprising:
a. synthesizing an α,α diol comprising a pendant POX group;
b. reacting a diisocyanate with a polysiloxane diol under a dry gas, such as dry air or nitrogen gas, at elevated temperature in the presence of a catalyst to form an intermediate;
c. reacting said intermediate with one or more diols, said one or more diols comprising an α,α diol comprising a pendant polyoxazoline group, to form a pre-polymer;
d. reacting said pre-polymer with an end group forming compound, said end group forming compound comprising at least one reactive double bond and a group capable of reacting with the pre-polymer, in the presence of a catalyst.

The synthesis of an α,α diol comprising a pendant POX group is known, and has for example been described on page 10 and in FIG. 7 of WO2009/058397, which is hereby incorporated by reference. US2010/0267897 is fully incorporated by reference in its entirety.

In a further method, the amount of the polysiloxane diol starting material used in the preparation of the macromer according to the invention may range from 45-85% by weight of the total weight of the polysiloxane diol starting material and the α,α-diol comprising the pendant POX group used in the preparation of the macromer and the amount of α,α-diol comprising the pendant POX group may range from 15-55% by weight of the total weight of the polysiloxane diol starting material and the α,α-diol comprising the pendant POX group used in the preparation of the macromer.

The present methods may change the reaction sequence and order of addition. For instance a polymer within the scope of the macromers according to the invention may be formed by first reacting an α,α-diol comprising a pendant POX group with a diisocyanate and chain extending the resultant prepolymer with a siloxane diol. This alters the end group composition and forms a polymer where the unit comprising a pendant POX group is adjacent to the end group as opposed to the siloxane unit being adjacent to the end group.

The macromers according to the invention may be included in a lens formulation, or more specifically, a contact lens formulation.

In an embodiment, the contact lens formulations comprise a macromer according to the invention, a silicone monomer, and a hydrophilic monomer.

In a further embodiment, the macromers according to the invention are made into contact lens formulations comprising more than 10 wt % of a silicone hydrogel and the macromer according to any one of claims and the resulting contact lenses have a water contact angle of less than 100 degrees and a water break up time of more than 1 second.

BRIEF DESCRIPTION OF THE DRAWINGS

FIG. 2 is a plot of water content (%) vs. relative humidity (%) for two hydrogel films.

FIG. 3 is a plot of total light intensity measurements in kcounts/mg pursuant to Example 12 for samples before and after autoclaving.

DETAILED DESCRIPTION

Figure 1:
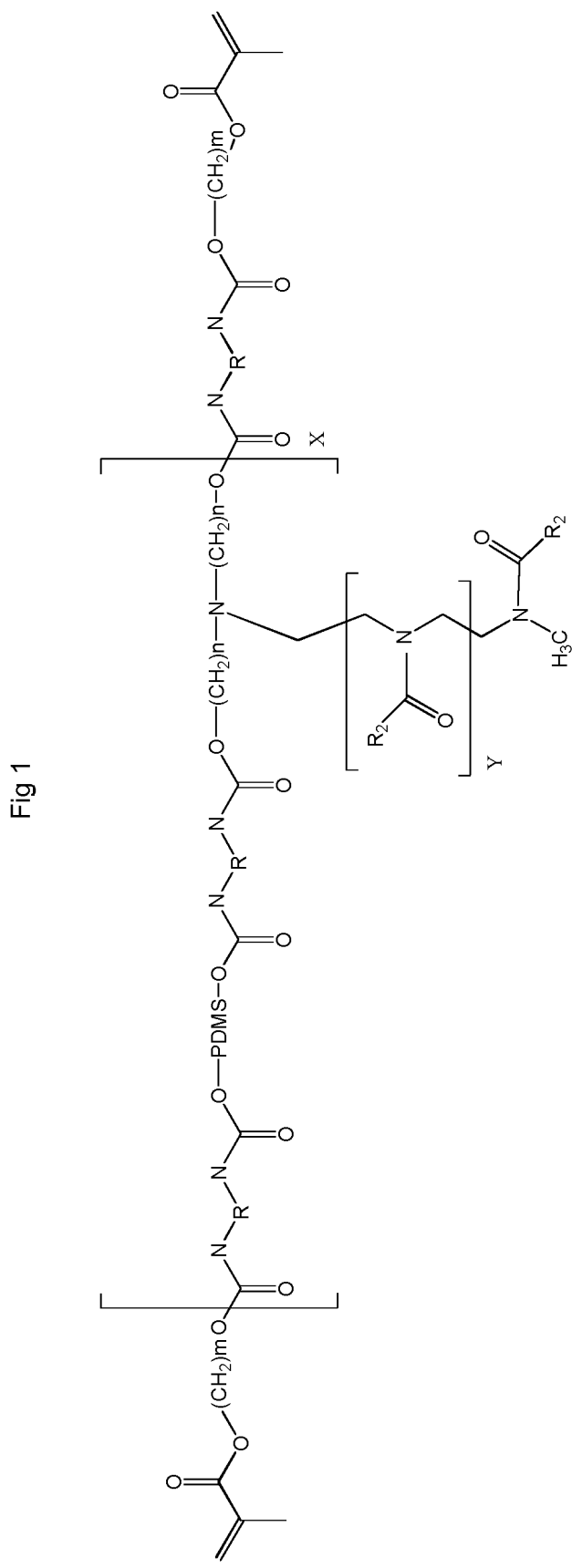
FIG. 1 is a chemical structure of an embodiment of the invention.

Unless defined otherwise, all technical and scientific terms used herein have the same meaning as commonly understood by one of ordinary skill in the art to which this invention belongs. Generally, the nomenclature used herein are well known and commonly employed in the art. In some instances, recognized by those in the art, conventional methods are used for laboratory procedures. Where a term is provided in the singular, the inventors also contemplate the plural of that term. The term "derived from" is intended to mean "made from" through single or multiple chemical reaction steps and the term "derivative" is intended to mean different examples or analogues of a general chemical composition.

As known to one of skill in the art, a pendant group or a side group is generally a group of molecules arranged in linear or branched conformations and attached to a so-called "backbone".

Depending on the order in which the various units are reacted with each other, the macromers according to the invention have a structure of any one of formulas (I)-(IV):

$$E_1\text{-}[X\text{-}Sil]_z\text{-}X\text{-}[[Y\text{-}[X\text{-}Sil]_n]_m\text{-}X\text{-}E_2 \qquad (I)$$

$$E_1\text{-}[[Y\text{-}[X\text{-}Sil]_n]_m\text{-}X\text{-}Y\text{-}E_2 \qquad (II)$$

$$E_1\text{-}[X\text{-}Y]_z\text{-}X\text{-}[Sil\text{-}[X\text{-}Y]_n]_m\text{-}X\text{-}E_2 \qquad (III)$$

$$E_1\text{-}Sil\text{-}[X\text{-}Y]_z\text{-}X\text{-}[Sil\text{-}[X\text{-}Y]_n]_m\text{-}X\text{-}Sil\text{-}E_2 \qquad (IV)$$

wherein
E1 and E2 are each independently end groups containing at least one reactive double bond,
Y is unit derived from a diol comprising at least one pendant POX group,
X is a unit derived from a diisocyanate,
Sil is a unit derived from di alkyl siloxane diol,
and wherein
m is an integer ranging from 1 to 50,
n is an integer ranging from 1 to 50, and
z is an integer ranging from 1 to 50.

In the macromer according to the invention E1 and E2 each independently are end groups containing at least one reactive double bond. End groups are functional groups that are located at the ends of the polymeric chain (e.g. E1 and E2 are each present at one end of the macromer). The end groups E1 and E2 can be the same or different. In the case that the macromers according to the invention will form part of a contact lens formulation, the end groups containing at least one reactive double bond may react with the other constituents of the contact lens formulation. The double bond can, for example, be formed by an acryl or methacryl group formed on the ends of the polymeric chain by reaction of an isocyanate group with, for example, hydroxy acrylate, methacrylate or acrylamide. Examples of compounds used to form end groups E1 and E2 include but are not limited to hydroxyl ethyl (meth)acrylate, hydroxyl propyl (meth)acrylate, and hydroxyl n-butyl (meth)acrylate or even hydroxyethylmethacrylamide. If excess diol is used in the last reaction step prior to end capping, isocyanatoethyl (meth) acrylate can for example be used for end capping.

In the macromer according to the invention, Y is a diol derived unit comprising at least one pendant POX group. The macromers according to the invention comprise pendant groups comprising a POX group. A pendant POX group comprises polymethyl oxazoline (PMeOX) or polyethyl oxazoline (PEtOx), and copolymers thereof. During synthesis of the macromer, the hydroxyl groups of the diols react with the isocyanate groups of the diisocyanates to form urethane bonds.

An example of a suitable diol from which Y may be derived is shown in the formula below.

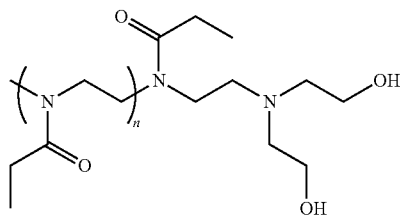

The synthesis of such diol is described in e.g. WO2009/058397, page 10 and FIG. 7, which is incorporated by reference. FIG. 1 shows a diol with a pendant polyethyl oxazoline group. The amine diol used in synthesis of the diol with a pendant POX group may be any dihydroxy secondary amine bearing moiety that is aliphatic or cyclo aliphatic.

The pendant group preferably has a number average molecular weight ranging from 300 to 5000 g/mol. In an embodiment, the pendant group has a molecular weight of from 400 to 2500 g/mol.

In the macromer according to the invention X is a unit derived from a diisocyanate unit. In the present instance, the uses of diisocyanates and the results of using diisocyanate in reactions with di-ols to obtain a urethane bond are generally well understood. The diisocyanates used in the preparation of the macromer according to the invention can comprise aromatic or aliphatic diisocyanates. The diisocyanates may be selected from the group comprising alkyl diisocyanates, arylalkyl diisocyanates, cycloalkylalkyl diisocyanates, alkylaryl diisocyanates, cycloalkyl diisocyanates, aryl diisocyanates, cycloalkylaryl diisocyanates, and mixtures thereof.

Examples of diisocyanates are isophorone diisocyanate, hexane diisocyanate, 1,4-diisocyanatocyclohexane, lysine-diisocyanate, naphthalene diisocyanate, 4,4'-diphenylmethane diisocyanate, hexamethylene diisocyanate, 2,4-toluene diisocyanate, 2,6-toluene diisocyanate, hexamethylene-1,6-diisocyanate, tetramethylene-1,4-diisocyanate, naphthalene-1,5-diisocyanate, xylylene diisocyanate, dicyclohexylmethane-4,4-diisocyanate, 1,4-benzene diisocyanate, 3,3'-diethoxy-4,4-diphenyl diisocyanate, m-phenylene diisocyanate, polymethylene polyphenyl diisocyanate, 4-isocyanatocyclo-4'-isocyanate, and mixtures thereof. Preferred are aliphatic diisocyanate units; more preferred are isophorone diisocyanate, 1,4-diisocyanatocyclohexane and mixtures thereof.

In the macromer according to the invention 'Sil' is a unit derived from a siloxane diol oligomer or siloxane diol polymer, which diol preferably comprises a poly di alkyl siloxane. Typically, the poly dialkyl siloxane diol is a poly di methyl siloxane diol, but other poly di alky siloxane diols may also be used.

Optionally, the macromer according to the invention can be extended by the use of known chain extenders, Suitable diols for use as chain extenders are for example butane diol, polycarbonate diol, hexane diol, and propane diol. As is known to a person skilled in the art, suitable chain extenders may also be di amines, in the case where the chains the chain extender is to connect to have an isocyanate end group.

The number average molecular weight of the total macromer according to the invention ranges from 8,000 to 50,000 g/mol, preferably ranging from 15,000 to 30,000 g/mol and more preferably ranging from 17,000 to 27,000 g/mol.

An example of a process used to form the macromer according to the invention follows. To obtain the present macromer, a diisocyanate is reacted with a poly alkyl siloxane diol under a dry gas, such as under nitrogen gas or dry air, at elevated temperature. For instance, the maximum exothermic temperature is preferably less than 80° C. to eliminate secondary reactions affecting the molecular weight and/or functionality of the resultant intermediate. More preferably the temperature is less than 75° C. The minimum temperature is generally 40° C., and the actual temperature is preferably about 55° C.

A catalyst is included in the diisocyanate-polysiloxane diol mixture used to form the intermediate. Exemplary catalysts include organometallic compounds based on mercury, lead, tin (dibutyltin dilaurate), tin octoate, bismuth (bismuth octanoate), and zinc or tertiary amines such as triethylenediamine (TEDA, also known as 1,4-diazabicyclo [2.2.2]octane or DABCO, an Air Products's trade mark), dimethylcyclohexylamine (DMCHA), and dimethylethanolamine (DMEA) or others known in the art may be added to the mixture. The amount of the catalyst may range from 0.01-0.04 wt %, preferably having 0.025 wt % based on the total weight of the reaction mixture. From this step, a diisocyanate-polysiloxane-diisocyanate intermediate is formed.

Next the diisocyanate-siloxane-diisocyanate mixture is reacted with one or more diols comprising a pendant POX group (POX-diol). The POX may be neutralized to form a neutralized POX-diol. The POX-diol polymerizes with the diisocyanate-siloxane-diisocyanate intermediate under stirring in the presence of a catalyst to form a pre-polymer. The maximum exothermic temperature is preferably less than 80° C. More preferably the temperature is less than 75° C. The minimum temperature is generally 40° C., and the actual temperature is preferably about 55° C.

The diisocyanate-siloxane-polyoxazoline prepolymer is purged with dry air and reacted with an end group forming compound, such as HEMA (hydroxyethyl methacrylate), and a catalyst. Other examples of end group forming compounds are HEA (hydroxyethyl acrylate), N-hydroxyethyl acrylamide (HEAA). The temperature for this reaction is preferably at least 35° C. and the maximum temperature is preferably less than 50° C. to eliminate auto polymerization of the end group forming compound. In the macromer the amount of siloxane unit may range from 45-85% by weight of the total weight of the siloxane unit and the polyalkylene oxide in the composition and the amount of POX group may range from 15-55% by weight of the total weight of siloxane unit and the POX group in the composition. More preferably the composition may include 75±5% by weight siloxane unit and 25±5% by weight POX group. In another embodiment, the composition may include 50±5% by weight siloxane and 50±5% by weight POX group.

In an embodiment, a macromer is provided according to the following formula,

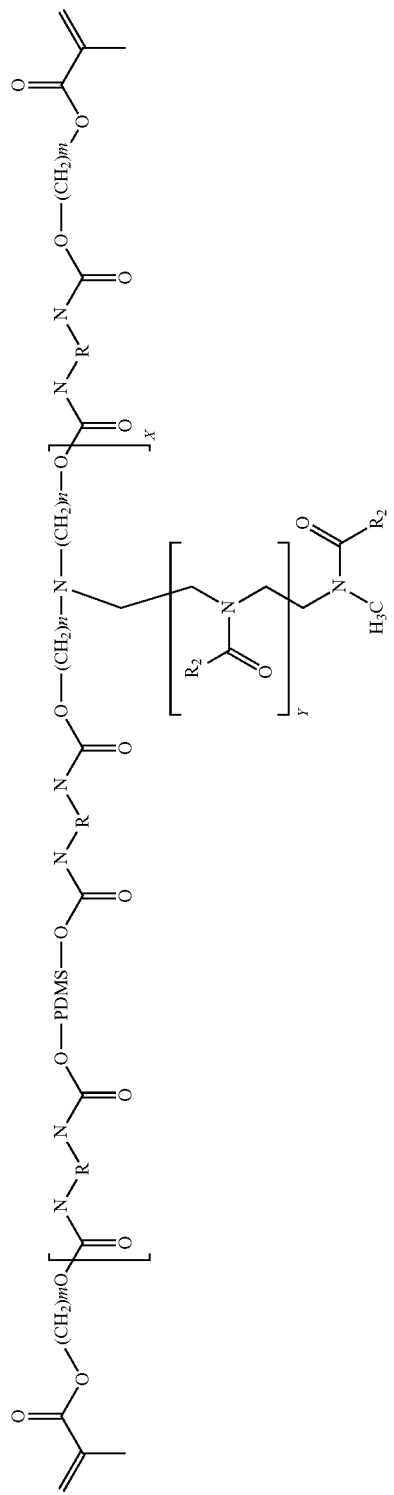

wherein m=2-5,

PDMS is a polydimethylsiloxane with a molecular weight ranging from 200 to 5000 g/mol, Y allows a range in Mw from 500-5000, n=2, R is a divalent aliphatic or cyclo aliphatic group Overall, the present methods include a polyurethane synthesis that permits reactant ratios and order of addition to be modified to control composition and molecular weight. Urethane bonds are formed through (or derived from) a reaction of a diol comprising a pendant POX group or siloxane diol with the diisocyanate. In this case the reaction sequence described above can be altered by first reacting the diol comprising the pendant POX group with the diisocyanate unit and chain extending the resultant prepolymer with the siloxane diol. This alters the end group composition, forming a polymer where POX would be adjacent to the end group as opposed to the siloxane unit being adjacent to the end group. It is also possible to alter the component ratio so the remaining group is a hydroxyl group instead of an isocyanate group. This allows an isocyanate end group such as isocyanatoethyl methacrylate (IEM) to be incorporated as the reactive double bond end group.

The number and molecular weight of diols: The hydroxyl number of the diols is determined using ASTM D4274: Standard Test Methods for Testing Polyurethane Raw Materials: Determination of Hydroxyl Numbers of Polyols or using the phosphorous NMR as indicated in the examples. Isocyanate content in the polymer and prepolymers was determined by titration using ASTM D2572: Standard Test Methods for Isocyanate Groups in Urethane Materials or Prepolymers.

Molecular weights of polymer: The molecular weights for all polymer samples are determined using guidelines set in ASTM D5296: Standard Test Method for Molecular Weight Averages and Molecular Weight Distribution of Polystyrene by High Performance Size-Exclusion Chromatography. GPC weight average molecular weight (Mw) and GPC number average molecular weight (Mn) in g/mol and the polydispersity index (PDI=Mw/Mn) of the macromers are determined by Gel Permeation Chromatography (GPC) using polystyrene standards and N,N-dimethylformamide (DMF) as the solvent at 80° C.

In embodiments, the macromers according to the present invention are used as crosslinking moieties in a contact lens formulation.

The term lens includes, but is not limited to, ophthalmic lenses, soft contact lenses, hard contact lenses, intraocular lenses, overlay lenses, ocular inserts, optical inserts, spectacle lenses, goggles, surgical glasses and the like. In a preferred embodiment the lens is a contact lens and more preferably a soft contact lens. Soft contact lenses are made from hydrogels and silicone elastomers or hydrogels, which include but are not limited to silicone hydrogels. "Silicone hydrogel" refers to a silicone-containing polymeric material which can absorb at least 10 percent by weight of water when it is fully hydrated and is obtained by copolymerization of a polymerizable composition comprising at least one silicone-containing vinylic monomer or at least one silicone-containing macromer or at least one crosslinkable silicone-containing prepolymer.

A person skilled in the art may make silicone hydrogel contact lenses, e.g., by cast-molding in molds of a lens formulation comprising at least a silicone containing monomer or polymer, at least one hydrophilic monomer or macromer, and other necessary components. The hydrophilic component can be (in total or in part) the macromer according to the invention. The contact lenses can be made with an ultraviolet or thermally curable formulation for use in a contact lens will frequently have a hydrophilic component which is approximately 30-80% by weight of the total weight of the composition. The hydrophilic components may be DMA (Dimethylacrylamide), HEMA, or NVP (N-vinyl pyrrolidone). The silicone component may account for approximately 20-70% by weight of the total composition. When contact lenses are made using the present polymers, preferably the contact lens comprises at least 10% silicone hydrogel and the present macromer. The silicone component may include TRIS (3-[tris(trimethylsilyloxy)silyl]-propyl methacrylate), SIGMA methyl bis(trimethylsiloxy)silyl propyl glycerol methacrylate and/or polydimethylsiloxanes.

A lens may consist of the macromers according to the present invention. On the other hand, the present macromers may be incorporated into a lens formulation as a crosslinker by reacting them with DMA and TRIS or SIGMA to form a partially polymerized product. The partially polymerized product may then be functionalized with one or more compounds having at least one reactive double bond. Preferably, lenses made with the macromers according to the invention include at least 10% by weight silicone hydrogel.

Various test methods and properties of lenses are described below.

Water Contact Angle

A "water contact angle" refers to a water contact angle (measured by Sessile Drop method), which is obtained by averaging measurements of at least 3 individual lenses. Lenses made with the macromers according to the invention generally have a water contact angle of less than 100°, but preferably have a water contact angle of 15° to 70°.

Water Processability

Obtaining water processable formulations is a goal of the contact lens industry as it reduces cost as well as organic solvent waste from both the lens manufacturing and the clean-up associated with the post-manufacturing. It also eliminates processing time since the transition to a contact lens solution from an organic solvent is eliminated. Residual organic solvent is eliminated as a potential problem in the final lens and eye safety. The present macromers assist in this goal by not needing organic solvents for clean-up or manufacturing.

Oxygen Permeability

The intrinsic "oxygen permeability", Dk, of a material is the rate at which oxygen will pass through a material. The term "oxygen permeability (Dk)" in reference to a material or a contact lens means an apparent oxygen permeability which is measured with a sample (film or lens) of 90 or 100 microns in average thickness over the area being measured according to a coulometric method described in Examples. Oxygen permeability is conventionally expressed in units of barrers.

The oxygen permeability of a lens and oxygen transmissibility of a lens may be determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties.

The oxygen permeability of contact lenses made using the macromers according to the invention is 40 barrer to 150 barrer, preferably 60 barrer to 90 barrer.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part and/or be combined in any manners. Therefore, the spirit and scope of the appended claims should not be limited to the description of the preferred versions contained therein.

EXAMPLES

Example 1

Synthesis and Characterisation of Diol Comprising a Pendant POX Group

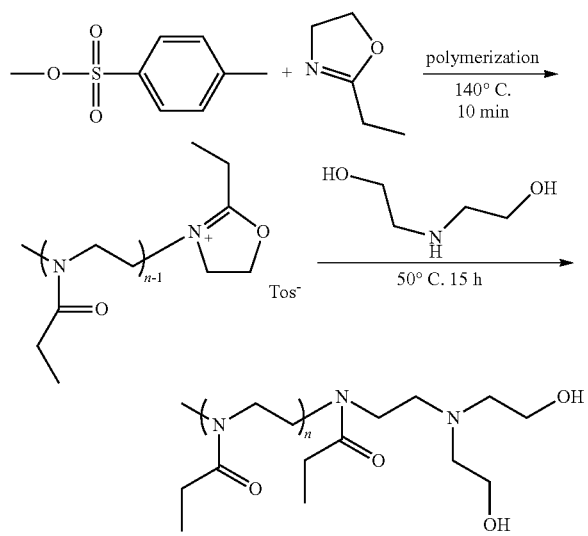

Raw Material Preparation/Materials and Methods:

Methyl p-toluenesulfonate and 2-ethyl-2-oxazoline were distilled prior to use and stored under $N_2$. A Biotage Initiator microwave synthesizer was used in these reactions.

GPC measurements were performed on a recorded on a Styragel HR5E and Styragel HR2 with a guard column at 50° C. and using THF as a solvent with a flow rate of 1.0 ml/min with polystyrene calibration standards with a Waters RI detector type 2414. Proton and $^{31}$P NMR spectra were recorded with $CDCl_3$ as solvent with a Bruker Avance 300 MHz Ultrashield instrument.

Synthesis

Methyl p-toluenesulfonate (0.677 g, 3.16 mmol) and 2-ethyl-2-oxazoline (3.965 g, 40.01 mmol) were transferred to 20 mL pre-dried microwave vials under nitrogen. Anhydrous acetonitrile (5.96 mL) was added to the vial. The vial was capped and placed in the autosampler of the microwave. After 10 s pre-stirring, the reaction solution was heated to 140° C. and left to react for 10 min. The vial was cooled to room temperature after completion. The reaction solution containing oligomer was quenched by addition of diethanolamine (0.665 g, 6.33 mmol) to the reaction mixture. The mixture was then heated at 50° C. for 15 h. After cooling to room temperature, the solvent was removed under reduced pressure. The residue was dissolved in 50 ml $CH_2Cl_2$ and washed twice by brine (2×75 mL). The organic layer was dried in $Na_2SO_4$ and evaporated to yield PEtOx as a white power (70%). The product was characterized by THF GPC using PS standards, $^1$H NMR and $^{31}$P NMR. The resulting polymer had an Mn of 772, a polydispersity of 1.12 and a degree of polymerization of 10. The OH-value as obtained by $^{31}$P NMR method for determining OH group (A. Granata et. al J. Agric. Food Chem. 1995, 43, 1538-1 544) is 83±3 mg KOH/g.

The OH group determination for the POX based building blocks was performed using $^{31}$-P NMR as described by Granata (J. Agric. Food Chem. 1995, 43, 1538-1 544), with cyclohexanol, and with a delay time of 3 seconds and 128 scan setting for the NMR spectroscopy measurements.

Example 2

Synthesis of a Methacrylate Terminated Macromere Comprising a Pendant POX Group

The macromers according to the invention can be prepared by the following methods.

Raw Material Preparation:

Shin-etsu X22-160AS polydimethylsiloxane diol (an exemplary PDMS diol) is potentially degassed under high vacuum (<2 torr) at elevated temperature 70-80° C. and the collected PDMS diol is stored under nitrogen. Isophorone Diisocyanate (IPDI) is distilled under high vacuum (<2 torr) at 100-120° C. The collected IPDI is stored under nitrogen.

Dibutyltin dilaurate (DBTDL) and Hydroxyethyl Methacrylate (HEMA) were used as received.

GPC measurements were performed on a Waters 150-C ALC/GPC gel permeation chromatograph Fitted with Phenomenex Phenogel Columns: set of three 10 μm: 100 Å, 104 Å, 106 Å, 300×7.8 mm, Model 305 Platform equipped with integrated temperature control set to 80° C. using DMF as a solvent with a flow rate of 1.0 ml/min with PMMA calibration standards with a Viscotek Refractive Index detector.

Example 2a

Synthesis of the methacrylate terminated macromer comprising pendant POX groups and units derived from polydimethylsiloxane (PDMS), starting from a molar ratio of siloxane diol to diol comprising pendant POX groups of 75:25

Step 1: Reaction of IPDI with PDMS Diol

A 250 mL RB flask was used as a reactor that was heated to 60° C. with a silicone oil bath on a hot plate. 20 g of PDMS diol, Shinetsu X22 160AS, was charged into the reactor. The reaction was blanketed with nitrogen gas. 7.3 g of IPDI was added into the reactor under magnetic stirring, followed by addition of 5 microliters of dibutyltin dilaurate. The reaction ran for 2 hours at 60° C.

Step 2: Reaction of IPDI-PDMS-IPDI with the Diol from Example 1

5.8 g of diol comprising a pendant POX group as prepared in Example 1 was dissolved in 40 mL of anhydrous THF in a container. The above solution was added into the reactor to polymerize with the intermediate from step 1 under magnetic stirring, followed by addition of 5 microliters of dibutyltin dilaurate. The reaction ran for 4 hours at 60° C.

Step 3: Endcapping of the Reaction Product from Step 2

Nitrogen gas blanket was switched to dry air purging. The temperature of the oil bath was lowered to 40° C. Another 40 mL of anhydrous THF was added to the reaction. 2 g of HEMA containing 10 mg of BHT was added to the reactor, followed by addition of 5 microliters of dibutyltin dilaurate. The reaction ran overnight at 40° C. The reaction was monitored by FTIR (Fourier Transform Infrared Spectroscopy) and GPC.

Example 2b

Synthesis of the Methacrylate Terminated Macromer Comprising Pendant POX Groups, Starting from a Molar Ratio of Siloxane Diol and Diol Comprising Pendant POX Groups of 50:50

Step 1: Reaction of IPDI with PDMS Diol

A 250 mL RB flask was used as a reactor that was heated to 60° C. with a silicone oil bath on a hot plate. 10 g of PDMS diol, Shinetsu 160AS, was charged into the reactor. The reaction was blanketed with nitrogen gas. 4.55 g of IPDI was added into the reactor under magnetic stirring, followed by addition of 5 microliters of dibutyltin dilaurate. The reaction ran for 2 hours at 60° C. If necessary, the reaction was monitored by FTIR and GPC.

Step 2: Reaction of IPDI-PDMS-IPDI with the Diol from Example 1

7.93 g of a diol obtained as described in Example 1 was dissolved in 40 mL of anhydrous THF in a container. The above solution was added into the reactor to polymerize with the intermediate from step 1 under magnetic stirring, followed by addition of 5 microliters of dibutyltin dilaurate. The reaction ran for 4 hours at 60° C. If necessary, the reaction was monitored by FTIR and GPC.

Step 3: Endcapping of the Reaction Product from Step 2

Nitrogen gas blanket was switched to dry air sparging. The temperature of the oil bath was lowered to 40° C. Another 40 mL of anhydrous THF was added to the reaction. 0.64 g of HEMA containing 5 mg of BHT was added to the reactor, followed by addition of 5 microliters of dibutyltin dilaurate. The reaction ran overnight at 40° C. The reaction was monitored by FTIR and GPC.

Table 1 shows components, reaction conditions, GPC molecular weight (Mn), and PDI for five lots corresponding to Example 2.

TABLE 1

Example 2 Lots

| Lot # | Molar ratios IPDI:PDMS diol:diol with pendant POX:HEMA | Reaction Temperature, ° C. for step 1, 2 and 3 resp. | Mn | PDI | PDMS: p-POX (weight ratio) |
|---|---|---|---|---|---|
| 1120321 (p-POX) | 2.000:1.250: 0.366:0.844 | 60-60-40 (oil bath) | 24096 | 1.8 | 75:25 |
| 1120327 (p-POX) | 2.000:1.250: 0.366:0.844 | 60-60-40 (oil bath) | 27971 | 1.8 | 75:25 |
| 1120345.001 (p-POX) | 2.000:1.250: 0.366:0.844 | 60-60-40 (oil bath) | 20184 | 1.7 | 75:25 |
| 1120345.002 (p-POX) | 2.000:1.250: 0.366:0.844 | 60-60-40 (oil bath) | 19481 | 1.8 | 75:25 |
| 1120368 (p-POX) | 2.000:1.000: 0.800:0.480 | 60-60-40 (oil bath) | 26802 | 2.1 | 50:50 |

Comparative Example 3

Synthesis of the Methacrylate Terminated Macromers with Pendant PEG Groups and a Molar Ratio of PDMS:PEG of 75:25

The reactions were carried out in bulk with no solvent. The diol comprising pendant PEG groups (YMER™ N120) was obtained from Perstorp.

Step 1: Reaction of IPDI (Isophorone Diisocyanate) with Polydimethylsiloxane (PDMS) Diol The temperature controller is set to the required temperature of less than 80° C., and preferably of around 55° C. and heating is started. Nitrogen gas was turned on. 58.24 grams of PDMS diol (ShinEtsu X22 160A) is charged into the reactor. Stirring is turned on. 58.2 grams of IPDI is added into the reactor under stirring, followed by addition of 0.07 grams dibutyltin dilaurate.

The reaction is run for 2 hours at 80° C. as a maximum exothermic temperature and preferably at a set point of about 55° C.

If necessary, the reaction is monitored by FTIR and GPC.

Step 2: Reaction of IPDI-PDMS-IPDI with a Diol Comprising Pendant PEG Groups 59.7 grams neutralized YMER™ N120, is added into the reactor to polymerize with the intermediate from step 1 under stirring, followed by the addition of 0.07 grams dibutyltin dilaurate. The reaction is run for 2 hours at less than 80° C. and around 55° C. If necessary, the reaction is monitored by FTIR and GPC testing.

Step 3: Endcapping of the Reaction Product of Step 2 with HEMA

Nitrogen gas is switched to dry air, and the pre-polymer is purged for at least 30 min. Dry air is kept sparging. 5.73 grams of HEMA (containing 0.5% wt BHT (Butylated hydroxytoluene)) is added to the reactor, followed by addition of 0.07 grams of dibutyltin dilaurate. The reaction is run overnight at the required temperature. The temperature can range from 20° C.-50° C., but is preferably 35° C. The reaction is monitored by FTIR and GPC testing.

Table 2 shows components, reaction conditions, GPC molecular weight (Mn), and PDI for the lot corresponding to Comparative Example 3.

TABLE 2

Comparative Example 3 Lot

| Lot # | Molar ratios IPDI:PDMS diol: diol with pendant PEG:HEMA | Mn | PDI | PDMS:p-PEG (weight ratio) |
|---|---|---|---|---|
| No. 1110392 | 2.000:1.250: 0.366:0.844 | 16381 | 2.02 | 75:25 |

Example 4

Hydrogel Films Made with Macromers of Example 2 and Comparative Example 3

For the purposes of comparison between macromers prepared using diols comprising pendant POX groups and diols comprising pendant PEG groups the samples from Lot 1120327 and Lot 1110392, the example and comparative example respectively, are used.

The macromers are combined with a hydrophilic monomer (HEMA, DMA) cured, and formed into hydrogel films. The reactive components used to prepare the films are reported as weight percent of all reactive components in Table 3.

Hydrogel films based on the various macromeres were prepared using solvent casting method. Briefly, the components in the amounts listed in Table 3 were mixed together with a stirring bar. The final reaction mixtures were mixed at 20° C. for at least 3 hours until all of the components were dissolved. Then, the reaction mixture was injected via a syringe into a mold that was made of a glass plate and a PE plate The dimensions of the mold is 120 mm (L)×50 mm (W)×1 mm (T). The molds were then exposed to UV light (Nordson UV MAC) under the following conditions:

Distance to lamp: 25 cm
UV-lamp: H-bulb (300 watts)
UV-dose: 12-14 J/cm$^2$ (300 sec exposure)

Mold temperature right after curing 65° C.
Time: 5 min

TABLE 3

Summary of the formulations used for hydrogel films

| formulation | Example A wt. % | Example A Grams | Comparative Example B wt. % | Comparative Example B Grams |
|---|---|---|---|---|
| HEMA | 5.96 | 0.433 | 5.96 | 0.433 |
| DMA | 39.27 | 2.855 | 39.27 | 2.855 |
| TEGDMA | 5.65 | 0.411 | 5.65 | 0.411 |
| Macromer with pendant POX | 48.12 | 3.498 | | |
| Macromer with pendant PEG | | | 48.12 | 3.498 |
| Darocur ® 1173 | 1 | 0.073 | 1 | 0.073 |
| Total | 100 | 7.269 | 100 | 7.269 |
| t-amylalcohol | 20.24 | 1.471 | 20.24 | 1.471 |

The films were cooled for 5 hours at −18° C. and peeled from the PE plate. Then the films were released from quartz glass, and dipped/extracted in a deionized water/isopropyl alcohol (IPA) mixture (5:1 vol %) at 20° C.

Example 5

Equilibrium Water Content Measurements

All hydrogel films made in Example 4 were immersed in DI water at 20° C. overnight before measurements. The % water content of the film was determined using the following equations:

% water content=100%*(Wt−Wo)/Wt

Where Wt is the weight of the fully hydrated film, and Wo is the weight of the dry film.
The results are reported in Table 4. The data show that the PEG-PDMS hydrogel film contained 49.57% water by weight, while the POX-PDMS contained 51.4% water by weight. Similar water contents obtained from POX-PDMS and PEG-PDMS hydrogel films indicated that these two macromers have similar hydrophobicity.

TABLE 4

Equilibrium water content measurements

| samples | average water content |
|---|---|
| Example A | 51.40 ± 0.58% |
| Comparative Example B | 49.57 ± 0.32% |

Example 6

Oxidative Stability of the Hydrogel Films of Example 4

Oxidative stability was investigated with an accelerated test (3% $H_2O_2$ at 70° C.) as described in ISO 10993-13: Biological evaluation of medical devices—Part 13: Identification and quantification of degradation products from polymeric medical devices. Treatments were done during 2 days after which chemiluminescence were determined. Chemiluminescence (CL) measurements were carried out on the luminometer Lumipol 3 produced at the Polymer Institute of SAS, Bratislava. This method allows determining polymer stability by measuring the intensity of the light emitted during thermal oxidation. The intensity of the emitted light (in counts/s) was recorded under a nitrogen flow rate of 25 ml/min and under non-isothermal conditions. Samples of approximately 5-15 mg were weighed onto aluminum pans with a diameter of 9 mm and put into the oven of the CL apparatus. After closing, the apparatus was flushed with nitrogen at 25° C. for 30 minutes. After this period, there is a temperature ramp of 10° C./min, followed by cooling the sample to room temperature. The recording of the luminescence started after closing the apparatus. The results are expressed as the accumulated total light intensity up to 200° C. in kcounts per mg sample. Table 4 shows this accumulated total light intensity in kcounts/mg as a function of treatment. The formulation comprising a macromer comprising pendant PEG groups exhibited stronger CL emission than the formulation based on a macromer comprising pendant POX groups after 2 days $H_2O_2$ treatment. This result indicates a significantly higher oxidative degradation of the PEG containing formulation than the POX based formulation. Therefore, the PEG containing formulation was more degraded than the POX containing formulation after the two days treatment in $H_2O_2$. The results are reported in Table 5.

TABLE 5

The total intensity of the light emitted from different formulations

| | REF sample (kcounts/mg) | After 2 days $H_2O_2$ (kcounts/mg) |
|---|---|---|
| Example A | 31351 ± 2965 | 53949 ± 4518 |
| Comparative Example B | 42103 ± 4565 | 90068 ± 14303 |

Example 7

Comparative Modulus of Hydrogel Films of Example 4

Dynamic mechanical thermal analysis (DMTA) was performed to determine the modulus of the hydrogel films of Example 4. Hydrogel films are equilibrated in DI water 24 hours prior to the measurement. The samples for the measurements were punched out of these films. For the measurements under wet conditions, the thickness of the film was measured with a calibrated Heidenhain thickness meter and the sample was mounted in a TA instruments RSA-III equipped with submersible clamps. Prior to the measurements the samples were capped at room temperature in the submersible cell for saturation. The dynamic mechanical analyses were carried out in accordance with ASTM D5026 using a TA RSA-III test system at a frequency of 1 Hz and over a temperature ranging from 10° C. to 70° C. with a heating rate of 1° C./min. The DMTA experiments showed the modulus of POX-PDMS at 34° C. to be 2.06 MPa, which is lower than that of 2.50 MPa for PEG-PDMS hydrogel films. The results are reported in Table 6

TABLE 6

| | Modulus @ 34° C. (wet) MPa |
|---|---|
| Example A | 2.06 |
| Comparative Example B | 2.50 |

Clearly, the high modulus values represent greater lens stiffness and greater resistance to shape change. POX-PDMS lens with a lower modulus is more likely to conform to the eye curvature, resulting in an improved contact lens comfort.

Example 8

Comparative wetting studies of hydrogel films of Example 4

All hydrogel films made in Example 4 were dried before measurements. Drying was performed in the vacuum oven under nitrogen at 80° C. for 16 h. After drying, dry weight was recorded and hydrogel samples were then placed in climate chambers Vökitsch industrietechniek type VC4018, with precisely controlled temperature and relative humidity. Temperature and humidity values are displayed and controlled by the software Simcon/32-Version 00.16. In all cases temperature was set to 23° C.

The accuracy of temperature setting is +/-1° C. Water content of the hydrogel films was investigated at three different relative humidities: 50%, 85% and 92%. The accuracy of relative humidity setting is between 1-2%. Weight of the samples at different humidities was recorded gravimetrically. Samples were conditioned in the chambers until reaching equilibrium swelling at given humidity (until constant weight). The equilibrium water content (EWC) at given humidity condition was calculated with the following equation:

$$EWC = [(M_{swollen} - M_{dry})/M_{swollen}] * 100 [\%]$$

Where $M_{swollen}$ is the equilibrium weight in swollen state and $M_{dry}$ is the dry weight of the sample. Sorption isotherm of different hydrogel films is obtained by plotting EWC as function of relative humidity (FIG. 2). It can be seen that the hydrogel comprising a macromer comprising pendant POX groups has similar changes in water content as the hydrogel comprising a macromer comprising pendant PEG groups during dehydration

Example 9

Protein Adsorption Measurements of Hydrogel Films of Example 4

The hydrogel films made in Example 4 were evaluated for protein uptake using bicinchoninic acid (BCA) assay according to the description provided by the manufacturer. Two films HEMA and HEMA/MAA (methylacrylic acid) were used in as reference samples. The components of the formulations used for the reference samples are displayed in Table 7. The curing conditions were the same as the conditions described in Example 4.

The films were immersed in phosphate buffered saline (PBS) for 24 hours at 20° C. 12-mm diameter circular film samples were introduced into a lysozyme solution (1 mL of 1.9 mg/mL lysozyme from chicken egg white in PBS), and incubated at 37° C. for 24 hours on an orbital shaker. To remove adhering protein solution, films were dropped into 10 mL PBS and gently blotted on lint-free bibulous paper. Protein adsorbed on and within the films was extracted for 22 hours into 2 mL of 0.1% trifluoroacetic acid: 50% acetonitrile: 49.9% water. Lysozyme concentration in this extraction solution was determined by MicroBCA analysis relative to lysozyme solutions of known concentrations. The results are shown in Table 8. The lower detection limit for the assay was 1 µg lysozyme per film sample.

TABLE 7

| Formulation | HEMA Reference wt. % | HEMA Reference grams | HEMA/MAA Reference wt. % | HEMA/MAA Reference Grams |
|---|---|---|---|---|
| HEMA | 93.35 | 6.000 | 91.483 | 6.000 |
| MAA | | | 1.867 | 0.122 |
| TEGDMA | 5.65 | 0.363 | 5.65 | 0.371 |
| Darocur 1173 | 1 | 0.064 | 1 | 0.066 |
| Total | 100 | 6.427 | 100 | 6.559 |
| t-amyl alcohol | 20.24 | 1.301 | 20.24 | 1.327 |

TABLE 8

| Samples | Protein deposition (µg/film) |
|---|---|
| HEMA Reference | 3.60 ± 0.82 |
| HEMA/MAA Reference | 513.24 ± 23.96 |
| Example A | 13.23 ± 2.86 |
| Comparative Example B | 11.01 ± 0.45 |

From Table 8 it can be seen that sample with poly (methacrylic acid) exhibited the highest lysozyme deposition from electrostatic interactions. Both PEG-PDMS and POX-PDMS based hydrogel films resulted in a remarkable reduction of lysozyme deposition. Thus, POX-PDMS hydrogel film showed a similar effect in preventing protein absorption as PEG-PDMS hydrogel film.

Since the pendant POX group is much shorter than a pendant PEG group with a similar molecular weight, it is surprising that films comprising macromers comprising pendant POX groups show such low protein adsorption.

Example 10

Oxygen Permeability Studies of Hydrogel Films of Example 4

Oxygen permeability was tested by following a standard test method from ASTM international (Designation D 3985-05). Test method covers the estimation of the steady-state rate of transmission of a gas through a sheet/film. The hydrogel films made in Example 4 were immersed overnight in DI water before the measurement. The sample is mounted to form a barrier between two chambers of a gas transmission cell. One chamber contains the test gas at specified high pressure and in the other chamber permeating gas has been collected and brought to a detector. Knowing the surface of a sample, gas transmission rate can be calculated as the quantity of a given gas passing through a unit surface of a film in unit time under the test conditions. Testing of oxygen permeation of hydrogel films was performed at a temperature of 34° C. and 95% relative humidity. Partial pressure of oxygen gas was 1 Atm. Oxygen permeability is calculated as a ratio of gas transmission rate and oxygen partial pressure multiplied by film thickness. The results are displayed in Table 9.

TABLE 9

| Material | Average Dk Barrer |
|---|---|
| Example A | 30.9 |
| Comparative Example B | 32.4 |

Example 11

Oxygen Permeability, Contact Angle, and Water Content of Contact Lenses

Two further lots of methacrylate terminated macromers comprising pendant POX groups were synthesized according to the procedure used in Example 2a. The formulas of these further lots can be found in Table 10.

TABLE 10

Additional Lots Used in Example 11 - macromers comprising pendant POX groups

| Lot # | IPDI:PDMS:POX:HEMA | Mn | PDI | PDMS:POX (by weight) |
|---|---|---|---|---|
| 1130222 | 2.000:1.250:0.366:0.844 | 20287 | 1.4 | 75:25 |
| 1130227 | 2.000:1.250:0.366:0.844 | 20618 | 1.4 | 75:25 |

One further lot of methacrylate terminated macromer comprising pendant PEG groups was synthesized according to the procedure used in Comparative Example 3. The formulas of this further lot can be found in Table 11.

TABLE 11

Additional Lots Used in Example 11 - macromer comprising pendant PEG groups

| Lot # | IPDI:PDMS:PEG:HEMA | Mn | PDI | PDMS:PEG (by weight) |
|---|---|---|---|---|
| 1120357 | 2.000:1.250:0.366:0.844 | 15077 | 2.3 | 75:25 |

Contact lenses were prepared according to the following procedure. The formulations used for the contact lenses are shown in Table 12. Amounts are given in wt %, based on the weight of the total formulation. SIGMA is methyl bis(trimethylsiloxy)silyl propyl glycerol methacrylate methacrylate, obtained from Gelest, Inc. All components were mixed in a 20 mL or 40 mL vial. 5 drops of the solution was dispended using a 1 mL polyethylene pipet into a polypropylene mold of a contact lens (diameter 14.2 mm) that was held on an aluminum frame. The prepared and charged molds of contact lens were placed in a UV oven at room temperature. The samples were UV cured at 60% intensity from an Intelli-Ray 400, UVB light source for 120 seconds. The polypropylene molds with the cured samples were opened and immersed in an IPA/DI water at a 1:1 ratio for at least 2 hours to demold the samples. These samples of contact lens were transferred to 0.1 M PBS solution and stored overnight before starting a test.

TABLE 12

Formulations of Contact Lenses

| | Example C | Example D | Example E | Comparative Example F |
|---|---|---|---|---|
| Macromer (lot) | 33 (1120345.001) | 33 (1130222) | 33 (1130227) | 33 (1120357) |
| SIGMA | 33.25 | 33.25 | 33.25 | 33.25 |
| DMA | 33.25 | 33.25 | 33.25 | 33.25 |
| Darocur® 1173 | 0.5 | 0.5 | 0.5 | 0.5 |

Table 13 shows results for oxygen permeability (Dk), contact angle (degree), and water content (wt %). Oxygen permeability was determined using the procedure of Example 10. Contact angle (captive bubble method) was measured using a Rame-hart goniometer. Water content was measured using the procedure of Example 8.

TABLE 13

Results for contact lens formulations of Example 11

| Example | Dk (Barrer) | Contact Angle (degrees) | Water Content (wt %) |
|---|---|---|---|
| Example C | 118 | 24 | 42 |
| Example D | 79 | 22 | 42 |
| Example E | 85 | 23 | 39 |
| Comparative Example F | 92 | 22 | 47 |

The contact lenses formed show properties that are desirable for commercial contact lenses.

Example 12

Autoclave Stability

Hydrogel films were formed from the formulations in Table 14 using the procedures of Example 4, except the curing time was 10 minutes instead of 5 minutes.

TABLE 14

Example 12 hydrogel film formulations

| | Example G | | Comparative Example H | |
|---|---|---|---|---|
| | wt. % | grams | wt. % | grams |
| Macromer Comprising Pendant POX Groups | 94 (Lot# 1130227) | 4.293 | | |
| Macromer Comprising Pendant PEG Groups | | | 94 (Lot# 1120357) | 4.293 |
| Darocur® 1173 | 1 | 0.046 | 1 | .046 |
| DMA | 5 | 0.228 | 5 | 0.228 |
| Subtotal | 100 | 4.567 | 100 | 4.567 |
| t-amyl alcohol | 17 | 0.781 | 17 | 0.781 |

Chemiluminescence (CL) measurements were carried out on the luminometer Lumipol 3 produced at the Polymer Institute of SAS, Bratislava. This method allows determining polymer stability by measuring the intensity of the light emitted during thermal oxidation. The intensity of the emitted light (in counts/s) was recorded under a nitrogen flow rate of 25 ml/min and under non-isothermal conditions. Samples of approximately 5-15 mg were weighed onto aluminum pans with a diameter of 9 mm and put into the oven of the CL apparatus. After closing, the apparatus was flushed with nitrogen at 25° C. for 30 minutes. After this period, there is a temperature ramp of 10° C./min, followed by cooling the sample to room temperature. The recording of the luminescence started after closing the apparatus. The results are expressed as the accumulated total light intensity up to 200° C. in kcounts per mg sample.

Samples were tested before autoclaving (G-1 and H-1) and after autoclaving (G-2 and H-2). The autoclaved samples are equilibrated in phosphate buffered saline solution in autoclave resistant vials and then autoclaved at 121° C. for 30 minutes. FIG. 3 shows the total light intensity in kcounts/mg. From left to right, the first bar corresponds to Example G-1 (film comprising a macromer comprising pendant POX before autoclaving), the second bar corresponds to Example G-2 (film comprising a macromer comprising pendant POX after autoclaving), the third bar corresponds to Comparative Example H-1 (film comprising a macromer comprising pendant PEG before autoclaving), and the fourth bar corresponds to Comparative Example H-2 (film comprising a macromer comprising pendant PEG after autoclaving). Higher autoclave stability corresponds to a lesser increase in total light intensity after autoclaving. The film formed from a formulation comprising a macromer comprising pendant POX groups exhibited surprisingly higher autoclave stability in the CL test than the film formed from a formulation comprising a macromer comprising pendant PEG groups.

The invention claimed is:

1. A macromer having the structure of formula (I) or (II) or (III) or (IV):

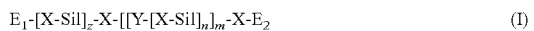   (I)

   (II)

   (III)

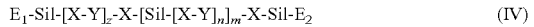   (IV)

wherein
E1 and E2 are end groups containing at least one reactive double bond,
Y is a diol derived unit comprising at least one pendant group comprising an oligomer or polymer derived from methyl oxazoline or ethyl oxazoline,
X is a unit derived from a diisocyanate,
Sil is a unit derived from siloxane diol oligomer or siloxane diol polymer, and wherein
m is an integer ranging from 1 to 50,
n is an integer ranging from 1 to 50, and
z is an integer ranging from 1 to 50.

2. The macromer according to claim 1, wherein the diisocyanate is an aliphatic diisocyanate.

3. The macromer according to claim 1, wherein the pendant group comprises between 2 and 30 repeat methyl oxazoline units and/or ethyl oxazoline units.

4. The macromer according to any one of claims 1-3, wherein the Sil unit consists of or is derived from a polydimethylsiloxane diol.

5. A macromer according to claim 1, wherein
at least one of E1 or E2 are derived from hydroxyethylmethacrylate (HEMA),
Y is unit derived from a diol comprising an oligomer or polymer derived from methyl or ethyl oxazoline,
X is a unit derived from isophorone diisocyanate (IPDI),
Sil is a unit derived from polydimethylsiloxane diol (PDMS).

6. The macromer according to claim 1, wherein the number average molecular weight of the total macromer is from 4,000 to 50,000 g/mol.

7. A method for the production of a macromer according to claim 1 comprising:
   a. reacting a diisocyanate with a polysiloxane diol unit to form an intermediate;
   b. reacting said intermediate with one or more diols derived from an oligomer or polymer derived from methyl oxazoline or ethyl oxazoline to form a pre-polymer;
   c. reacting said pre-polymer with a compound having at least one reactive double bond.

8. The method of claim 7, wherein step a is performed under a first dry gas at elevated temperature in the presence of a catalyst, step b is performed under a second dry gas with stirring in the presence of a catalyst, and step c is performed in the presence of a catalyst.

9. The method of claim 8, wherein the first dry gas is air or nitrogen and the second dry gas is nitrogen.

10. The method of claim 7, wherein the amount of siloxane unit is from 45-85% by weight of the total weight of polysiloxane and diol unit comprising an oligomer or polymer derived from methyl or ethyl oxazoline in the composition and the amount of oligomer or polymer derived from methyl or ethyl oxazoline is from 15-55% by weight of the total weight of polysiloxane and diol unit comprising an oligomer or polymer derived from methyl or ethyl oxazoline in the composition.

11. A contact lens formulation comprising a macromer according to claim 1.

12. The contact lens formulation according to claim 11, further comprising a silicone monomer and a hydrophilic monomer.

13. The contact lens formulation according to claim 12, wherein the silicone monomer comprises (3-[tris(trimethylsilyloxy)silyl]-propyl methacrylate) or methyl bis(trimethylsiloxy)silyl propyl glycerol methacrylate.

14. A contact lens formed from the contact lens formulation of claim 12.

15. The contact lens according to claim 14, wherein the contact lens formulation comprises a macromer according to formula (I).

16. A contact lens formed from the contact lens formulation of claim 11.

17. The contact lens according to claim 16, wherein the contact lens formulation comprises a macromer according to formula (I).

18. The macromer according to claim 1, wherein the macromer has a structure according to formula (II).

19. The macromer according to claim 1, wherein the macromer has a structure according to formula (III).

20. The macromer according to claim 1, wherein the macromer has a structure according to formula (IV).

* * * * *